(12) United States Patent
Jeon

(10) Patent No.: US 9,706,566 B2
(45) Date of Patent: Jul. 11, 2017

(54) UPLINK INTERFERENCE MITIGATION METHOD AND APPARATUS

(71) Applicant: INTELLECTUAL DISCOVERY CO., LTD., Seoul (KR)

(72) Inventor: Hyung Joon Jeon, Seongnam-si (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 0 days.

(21) Appl. No.: 14/248,797

(22) Filed: Apr. 9, 2014

(65) Prior Publication Data

US 2014/0220995 A1   Aug. 7, 2014

Related U.S. Application Data

(63) Continuation of application No. 12/922,440, filed as application No. PCT/KR2009/001203 on Mar. 11, 2009, now Pat. No. 8,711,819.

(30) Foreign Application Priority Data

Mar. 11, 2008 (KR) ........................ 10-2008-0022627

(51) Int. Cl.
*H04W 88/02* (2009.01)
*H04W 72/12* (2009.01)
*H04W 72/08* (2009.01)
*H04W 36/20* (2009.01)

(52) U.S. Cl.
CPC ..... *H04W 72/1252* (2013.01); *H04W 72/082* (2013.01); *H04W 36/20* (2013.01)

(58) Field of Classification Search
CPC  H04W 72/1252; H04W 72/082; H04W 36/20
See application file for complete search history.

(56) References Cited

U.S. PATENT DOCUMENTS

| | | | |
|---|---|---|---|
| 6,791,995 B1 | 9/2004 | Azenkot et al. | |
| 6,968,192 B2 * | 11/2005 | Longoni | 455/453 |
| 7,310,303 B2 | 12/2007 | Koo et al. | |
| 7,995,549 B2 * | 8/2011 | Karlsson | 370/342 |
| 8,305,975 B2 * | 11/2012 | Tortora | 370/329 |
| 8,320,928 B2 * | 11/2012 | Wu et al. | 455/452.2 |
| 2006/0101168 A1 | 5/2006 | Roh et al. | |
| 2006/0184854 A1 | 8/2006 | Ihm et al. | |
| 2007/0206561 A1 | 9/2007 | Son et al. | |
| 2008/0089399 A1 | 4/2008 | Azenko et al. | |
| 2009/0022178 A1 | 1/2009 | Ji et al. | |
| 2010/0080180 A1 * | 4/2010 | Tortora | 370/329 |
| 2010/0296477 A1 | 11/2010 | Hason et al. | |

* cited by examiner

*Primary Examiner* — Phuc Tran

(57) ABSTRACT

Disclosed is a method and apparatus for mitigating uplink interference in the wireless communication system, wherein the method comprises determining a loading-status value for each sector; if the loading-status value is not greater than the first threshold value, generating UL zone switch IE and UL allocation start IE to allocate data bursts of the sectors to different subchannels; and preparing an uplink map using the UL zone switch IE and UL allocation start IE for each sector, wherein the uplink duration indicates a duration where all the subchannels are used for allocation of the data burst.

8 Claims, 5 Drawing Sheets

UPLINK INTERFERENCE MITIGATION METHOD AND APPARATUS

CROSS-REFERENCE TO RELATED APPLICATIONS

This is a continuation of application Ser. No. 12/922,440 filed Dec. 6, 2010, which is a national stage application of PCT International Patent Application No. PCT/KR2009/001203 filed Mar. 11, 2009 and claims the benefit of Korean Patent Application 10-2008-0022627 filed Mar. 11, 2008, the disclosure of which is incorporated herein its entirety by reference.

BACKGROUND

Field of the Invention

The present invention relates to a wireless communication system, and more particularly, to a method and apparatus for mitigating uplink interference in the wireless communication system.

Discussion of the Related Art

Based on a proposed standard of IEEE (Institute of Electrical and Electronics Engineers) 802.16, BWA (Broadband Wireless Access) supporting OFDMA (Orthogonal Frequency Division Multiplexing Access) allows to transmit much information in a short time owing to a broadband frequency, wherein the frequency in one frequency band is divided and is then efficiently used by plural users.

This wireless communication system one-dimensionally allocates data bursts for an uplink duration except a predetermined region in a symbol (time)-first order. That is, if the data burst allocation is completed for all subchannels in a certain symbol, the data burst allocation is started for the subchannels in the next symbols. This method implies that all the subchannels for each sector are used for the data burst allocation.

However, as shown in FIG. 1, if the data burst is allocated to all the subchannels in each sector for the uplink duration, interference may occur by the neighboring sectors. In order to overcome this problem, if a cell loading factor is equal to or greater than a predetermined value, as shown in FIG. 2, the data burst is allocated to all the subchannels for each sector, and a permbase value for permutation of the sector is differently set for each sector. Accordingly, the inter-sector interference is averaged out for each subchannel, and thus the interference of the neighboring sectors is mitigated. If the cell loading factor is less than the predetermined value, as shown in FIG. 3, a method has been proposed for mitigating the interference among the sectors by differently setting a subchannel region to be allocated with the data burst for each sector, and setting the same permbase value in each sector for permutation.

For mitigating the interference for the uplink duration by the aforementioned method, it is required to dynamically change the aforementioned set information to define the data burst allocation region according to the cell loading status.

However, the aforementioned set information may be formed with TLV (Type, Length, Value) such as UL allocated subchannels bitmap or UL AMC allocated physical bands bitmap. However, the aforementioned TLV is included in UCD (Uplink Change Descriptor). That is, if the aforementioned set information is changed, considerable time is needed until the changed set information is applied to each mobile station. Eventually, it is difficult to efficiently mitigate the sector interference for the uplink duration.

SUMMARY

Accordingly, the present invention is directed to a method and apparatus for mitigating uplink interference that substantially obviates one or more problems due to limitations and disadvantages of the related art.

Technical Solution

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an uplink interference mitigation method in an uplink duration comprising: determining a loading-status value for each sector; if the loading-status value is not greater than the first threshold value, generating UL zone switch IE and UL allocation start IE to allocate data bursts of the sectors to different subchannels; and preparing an uplink map using the UL zone switch IE and UL allocation start IE for each sector, wherein the uplink duration indicates a duration where all the subchannels are used for allocation of the data burst.

In addition, the method further comprises allocating the data burst of the sectors by using the subchannels defined by the UL zone switch IE and UL allocation start IE.

The step of generating the UL zone switch IE and UL allocation start IE comprises: setting a subchannel use type and permbase value included in the UL zone switch IE; and setting a subchannel offset included in the UL allocation start IE.

If the loading-status value for each sector is equal to or smaller than the first threshold value, and simultaneously larger than the second threshold value, some of the sectors are set with the same permbase value, and the subchannel use type of the sectors is set to use all the subchannels during setting the permbase value and subchannel use type; and the subchannel offset is differently set for each of the sectors with the same permbase value during setting the subchannel offset.

The sector to be set with the different permbase value is changed every frame.

Also, the sector to be set with the different permbase value is determined as the sector where a mobile station with high CINR (Carrier to Interference Noise Ratio) is positioned.

If the loading-status value for each sector is not greater than the second threshold value, all the sectors are set with the same permbase value, and the subchannel use type of the sectors is set to use all the subchannels during setting the permbase value and subchannel use type; and the subchannel offset is differently set for each of the sectors during setting the subchannel offset.

The subchannel offset of the sectors is determined by the ratio of the number of sectors and the number of subchannels.

The subchannel offset of the sectors is determined by the ratio of the number of sectors and the number of subchannels, and the loading-status value for each sector.

All the subchannels are used as the data burst allocation region for the uplink duration through the use of at least one of UL allocated subchannels bitmap or UL AMC allocated physical bands bitmap included in a UCD message.

In another aspect of the present invention, there is provided an uplink interface mitigation method in an uplink duration comprising: determining a loading-status value for each sector; if the loading-state value is larger than the first threshold value, generating UL zone switch IE to allocate data bursts of the sectors to all subchannels; and preparing an uplink map of each sector through the use of UL zone switch IE, wherein the uplink duration indicates a duration where some of the subchannels among all the subchannels are used for allocation of the data burst.

In another aspect of the present invention, there is provided an uplink interference mitigation apparatus comprising: a UCD message generating means which generates a UCD message defining that all subchannels for an uplink duration are used as data burst allocation regions; a loading-status determining means which determines a loading-status value for each sector; and a map message generating means which generates UL zone switch IE and UL allocation start IE to allocate data bursts to different subchannels for the respective sectors, and allocates the generated UL zone switch IE and UL allocation start IE to a UL-MAP region of each sector, when the loading-status value of each sector is not greater than the first threshold value.

In another aspect of the present invention, there is provided an uplink interference mitigation apparatus comprising: a UCD message generating means which generates a UCD message defining that some of subchannels for an uplink duration are used as data burst allocation regions; a loading-status determining means which determines a loading-status value for each sector; and a map message generating means which generates UL zone switch IE and UL allocation start IE to use all the subchannels of the sectors, and allocates the generated UL zone switch IE and UL allocation start IE to a UL-MAP region of each sector, when the loading-status value of each sector is larger than the first threshold value.

In another aspect of the present invention, there is provided an uplink interference mitigation method comprising: setting a value of UL zone switch IE to indicate whether a subchannel allocation region of an uplink duration is changed or not according to an interference level; setting a value of UL allocation start IE to indicate a starting point of the subchannel allocation region of the uplink duration; and transmitting a UL-MAP message generated using the UL zone switch IE and UL allocation start IE.

In another aspect of the present invention, there is provided an uplink interface mitigation method comprising: receiving a UL-MAP message including a value of UL zone switch IE and a value of UL allocation start IE, wherein the value of UL zone switch IE indicates whether a subchannel allocation region of an uplink duration is changed or not according to an interference level, and the value of UL allocation start IE indicates a starting point of the subchannel allocation region of the uplink duration; and allocating a UL data burst to a subchannel defined by the UL-MAP message.

In another aspect of the present invention, there is provided an uplink interference mitigation method comprising: generating a UP-MAP message to change at least one of the number or position of subchannels used for an uplink duration according to a cell loading status; and transmitting the UP-MAP message.

It is to be understood that both the foregoing general description and the following detailed description of the present invention are exemplary and explanatory and are intended to provide further explanation of the invention as claimed.

Advantageous Effects

The method and apparatus for mitigating uplink interference according to the present invention enables to mitigate the UL interference.

Also, the subchannel allocation may be dynamically changed to mitigate the UL interference.

DETAILED DESCRIPTION OF THE INVENTION

Reference will now be made in detail to the preferred embodiments of the present invention, examples of which are illustrated in the accompanying drawings.

Figure 1:
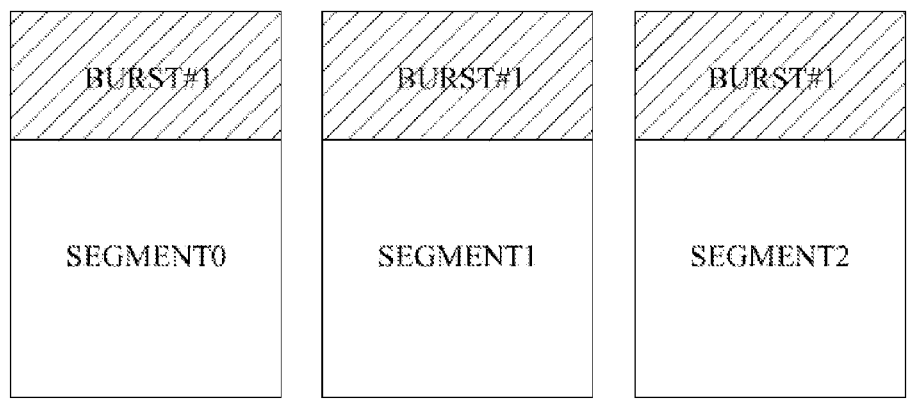
FIG. 1 illustrates an interference for an uplink duration.
Figure 2:
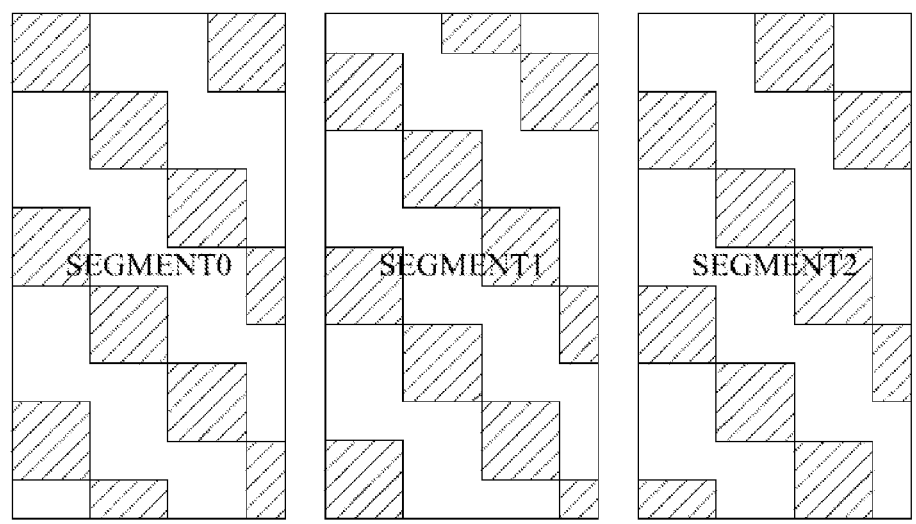
FIG. 2 illustrates a related art interference mitigation method when a data burst is allocated to all subchannels for an uplink duration.
Figure 3:
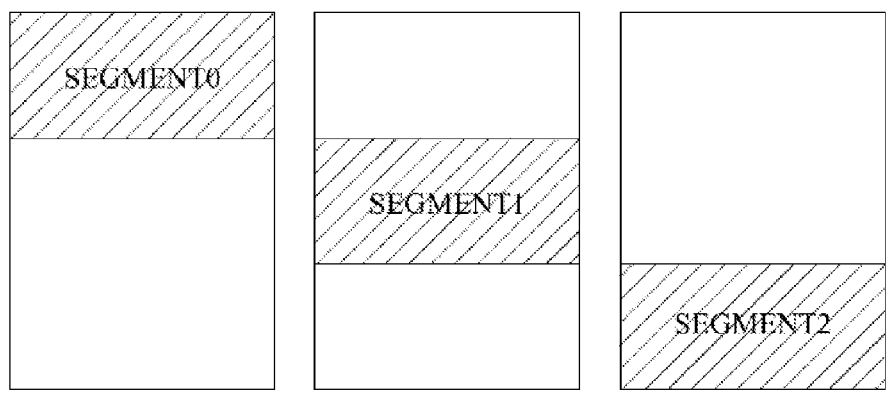
FIG. 3 illustrates a related art interference mitigation method when a data burst is allocated to some of subchannels for an uplink duration.
Figure 4:
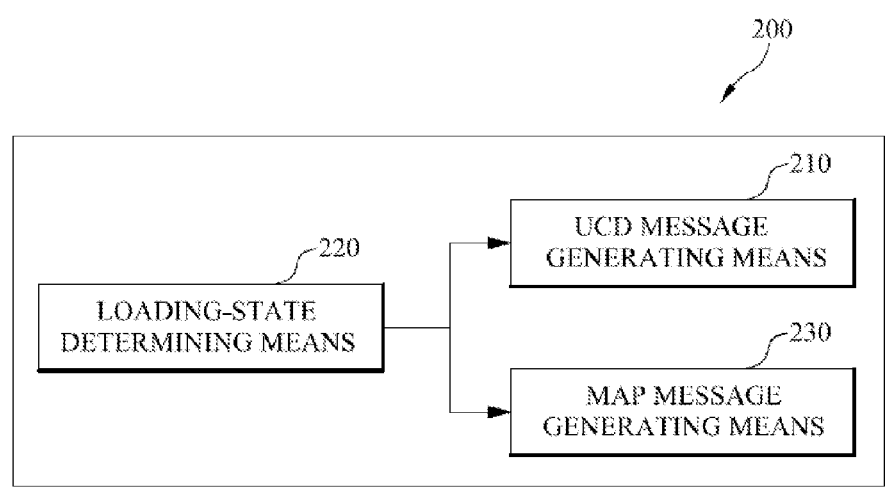
FIG. 4 is a block diagram illustrating an uplink interference mitigation apparatus according to one embodiment of the present invention.

FIG. 4 is a block diagram illustrating an uplink interference according mitigation apparatus to one embodiment of the present invention. As shown in FIG. 4, the uplink interference mitigation apparatus 200 includes a UL channel descriptor (hereinafter, referred to as 'UCD') message generating means 210, a loading-status determining means 220, and a map message preparing means 230.

The UCD message generating means 210 generates a UCD message to be allocated to a UCD region, wherein the UCD message defines a region to be allocated with a data burst for an uplink duration.

The UCD message generating means 210 according to one embodiment of the present invention may creat the UCD message to define all or some of subchannels for the uplink duration as the data burst allocation region.

According to one embodiment of the present invention, the UCD message generating means 210 generates the UCD message including TLV (Type, Length, Value) of UL allocated subchannels bitmap or UL AMC allocated physical bands bitmap, to define the region to be allocated with the data burst for the uplink duration.

In more detail, if all the subchannels for the uplink duration of each sector are defined as the data burst allocation region by using the TLV of UL allocated subchannels bitmap or UL AMC allocated physical bands bitmap, a permbase value for each sector may be differently set so as to mitigate the sector interference. In the embodiment of the present invention, the UL allocated subchannels bitmap, UL AMC allocated physical bands bitmap, and permbase value for each segment may be defined as the following Table 1.

TABLE 1

| UL allocated shbchannels bitmap | Segment 0 | 0x00 0x00 0x00 0x00 0x07 0xFF 0xFF 0xFF 0xFF |
| --- | --- | --- |
| | Segment 1 | 0x00 0x00 0x00 0x00 0x07 0xFF 0xFF 0xFF 0xFF |
| | Segment 2 | 0x00 0x00 0x00 0x00 0x07 0xFF 0xFF 0xFF 0xFF |
| UL AMC Allocated physical bands bitmap | Segment 0 | 0x000000 FFFFFF |
| | Segment 1 | 0x000000 FFFFFF |
| | Segment 2 | 0x000000 FFFFFF |
| Permutation base | Segment 0 | x |
| | Segment 1 | x + 1 |
| | Segment 2 | x + 2 |

In above Table 1, the segment corresponds to each sector. For convenience of the explanation, supposing that one cell comprises three sectors, and the three sectors correspond to 'segment 0', 'segment 1', and 'segment 2'. As shown in above Table 1, all the subchannels are used for the data burst allocation region for each segment. The UL PUSC zone uses the TLV of UL allocated subchannels bitmap, and uses the 35 subchannels. The BAND AMC uses the TLV of UL AMC allocated physical bands bitmap, and uses the 24 bands.

Also, the permbase values are differently set for the respective segments.

If trying to define some of the subchannels of the uplink duration for each segment as the data burst allocation region through the use of TLV of UL allocated subchannels bitmap or UL AMC allocated physical bands bitmap, the UL allocated subchannels bitmap, UL AMC allocated physical bands bitmap, and permbase value for each segment may be defined as the following Table 2.

TABLE 2

| UL allocated shbchannels bitmap | Segment 0 | 0x00 0x00 0x00 0x00 0x00 0x00 0x00 0x0F 0xFF |
| --- | --- | --- |
| | Segment 1 | 0x00 0x00 0x00 0x00 0x00 0x00 0xFF 0xF0 0x00 |
| | Segment 2 | 0x00 0x00 0x00 0x00 0x07 0xFF 0x00 0x00 0x00 |
| UL AMC Allocated physical bands bitmap | Segment 0 | 0x000000 0000FF |
| | Segment 1 | 0x000000 00FF00 |
| | Segment 2 | 0x000000 FF0000 |
| Permutation base | Segment 0 | x |
| | Segment 1 | x |
| | Segment 2 | x |

In above Table 2, if the region to be allocated with the data burst is differently set for each segment through the use of TLV of UL allocated subchannels bitmap in the UL PUSC zone, the 'segment 0' uses subchannels from 0 to 11, the 'segment 1' uses subchannels from 12 to 23, and the 'segment 2' uses subchannels from 24 to 34.

If the region to be allocated with the data burst is differently set for each segment through the use of TLV of UL AMC allocated physical bands bitmap in the UL Band AMC zone, the 8 bands are defined as the data burst allocation region for each segment.

In this case, the permbase value for each segment is set identically.

The UCD message generating means 210 sets the region to be allocated with the data burst for the uplink duration in each segment through the use of TLV of UL allocated subchannels bitmap or UL AMC allocated physical bands bitmap, and generates the UCD message including the TLV to be allocated to the UCD region.

The loading-status determining means 220 receives information about the data bursts to be transmitted from an upper layer, and determines the loading status of each segment and the loading status of the cell according to the size of the data bursts to be transmitted. Herein, the loading means virtually-allocated resources among total usable resources.

The loading status of each segment and the loading status of the cell affect the interference among the segments. Thus, it is for dynamically changing the subchannel allocated with the data burst according to the loading status. This is why the loading status of each segment and the loading status of the cell are determined.

According to one embodiment of the present invention, the loading-status determining means 220 determines the loading status every frame or every scheduling period. At this time, the loading-status determining means 220 calculates a loading factor of each segment and a loading factor of the cell by using a ratio of the total number of usable slots and the number of slots required by the scheduling result, and then determines the loading status according to the loading ratio. In consideration to the uplink duration, the total number of usable slots may be calculated by the following Equation 1.

$$\text{the total number of usable slots} = \text{the number of subchannels} \times \frac{\text{the number of symbols}}{3} \quad \text{[Equation 1]}$$

The loading factor of the cell may be calculated by adding the loading factors of the segments.

The map message generating means 230 generates a MAP message allocated in MAP region for the uplink duration. Generally, an uplink MAP message includes information about uplink bursts. If it is needed to change the data burst allocation region based on the cell loading status determined by the loading-status determining means 220, the map message generating means 230 according to one embodiment of the present invention generates information elements (IE) to change the data burst allocation region in the MAP message.

In case that, all the subchannels for the uplink duration are set as the data burst allocation region in the UCD message for each segment, and the cell loading factor determined by the loading-status determining means 220 is not greater than a predetermined threshold value, the data burst is allocated to part of the all available subchannels for each segment, instead of allocating the data burst to all the subchannels. In this case, preferably, the data burst allocation region is differently set for each segment, to thereby realize the improved efficiency.

The map message generating means 230 prepares UL zone switch IE and UL allocation start IE in the map region, whereby the data burst allocation region is changed from all of the subchannels to part of the all available subchannels.

In this case, the construction of UL zone switch IE is shown in the following Table 3, and the construction of UL allocation start IE is shown in the following Table 4.

TABLE 3

| Syntax | Size | Notes |
|---|---|---|
| UL_Zone_IE ( ) { | | |
| Extended UIUC | 4 | UL_Zone = 0x04 |
| Length | 4 | Length = 0x03 |
| OFDMA symbol offset | 7 | 0b00 = PUSC permutation |
| | | 0b10 = Adjacent subcarrier permutations |
| | | 0b11 = Reserved |
| Permutation | 2 | |
| UL_Permbase | 7 | |
| AMC Type | 2 | Indicates the AMC type in case permutation type = 0b10, otherwise shall be set to 0. |
| | | AMC type (NxM = N bins by M symbols): |
| | | 0b00 - 1x6 |
| | | 0b01 - 2x3 |
| | | 0b10 - 3x2 |
| | | 0b11 - Reserved |
| Use All SC Indicator | 1 | 0 = Do not use all subchannels |
| | | 1 = Use all subchannels |
| Disable subchannel rotation | 5 | Only applies to PUSC permutation (see section 8.4.6.2.6) |
| | | 0 = subchannel rotation enabled |
| | | 1 = subchannel rotation disabled |
| reserved | 4 | |
| } | | |

In above Table 3, 'OFDMA symbol offset' indicates an offset of an OFDMA symbol where the corresponding zone is to be started, wherein an offset value is defined by the unit of symbol. Also, 'permutation' indicates the permutation used for allocation of the data burst according to the UL zone switch IE, wherein the permutation is used as a base value for permutation of UL permbase value.

'Use All SC Indicator' indicates whether all the subchannels are used or not. If it is '0', it indicates that the subchannels defined by the subchannel bitmap included in the UCD message are used. In the meantime, if it is '1', it indicates that all the subchannels are used.

TABLE 4

| Syntax | Size | Notes |
|---|---|---|
| UL Allocation start IE ( ) { | | |
| Extended UIUC | 4 | UL_Allocation_start_IE( ) = 0x0A |
| Length | 4 | Length = 0x02 |
| OFDMA symbol offset | 8 | This value indcates start symbol offset of all subsequent UL allocations in this UL_MAP message (UL-MAP or SUB-UL-DL-MAP). The reference point of this offset is the start of UL sub-frame. |
| Subchannel offset | 7 | This value indicates start subchannel offset of all subsequent UL data burst allocations in this message (UL-MAP or SUB-UL-DL-MAP). |
| reserved | 1 | Shall be set to zero. |
| } | | |

In above Table 4, 'UL allocation start IE' includes the OFDMA symbol offset and subchannel offset, whereby the subchannel offset is differently set for each segment.

Hereinafter, a method for generating the aforementioned UL zone switch IE and UL allocation start IE according to the cell loading status by the map message generating means 230 will be described in detail as follows.

First, if the loading factor for each segment determined by the loading-status determining means 220 is not greater than the first threshold value, for example, it is not greater than about ⅓, the permbase value included in the UL zone switch IE is identically set for each segment by the map message generating means 230. That is, if the permbase value of 'segment 0' is 'x', the permbase value of each of 'segment 1' and 'segment 2' is set as 'x'. Also, the value of 'Use All SC Indicator' included in the UL zone switch IE is set as '1', whereby all the subchannels are used.

Then, the subchannel offsets for the segments included in the UL allocation start IE are differently set by the map message generating means 230. In one embodiment of the present invention, the subchannel offset of each segment may be calculated by the number of subchannels and the number of segments, that is, the subchannel offset of each segment may be calculated by the following Equation 2.

$$\text{subchannel offset} = \text{round}\left(\frac{\text{the number of subchannels}}{\text{the number of segments}}\right) \times \text{segment number} \quad [\text{Equation 2}]$$

Herein, 'round( )' indicates that the value included in ( ) is rounded off.

For example, if the number of subchannels in the UL PUSC zone is 35, and the number of segments is 3; the subchannel offset of 'segment 0' becomes the subchannel 0, the subchannel offset of 'segment 1' becomes the subchannel 12, and the subchannel offset of 'segment 2' becomes the subchannel 24.

Figure 5:
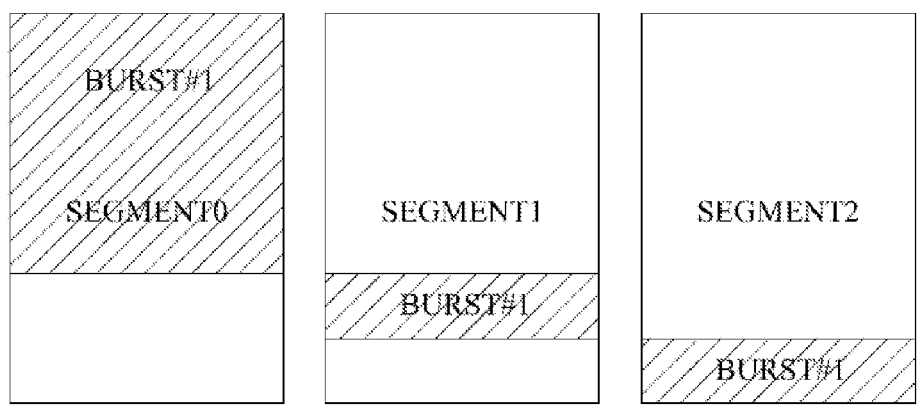
FIG. 5 illustrates a subchannel offset for each segment, which is calculated by a loading factor for each segment.

In a modified embodiment of the present invention, the subchannel offset for each segment may be calculated by using the loading factor of each segment. For example, if the loading factor of 'segment 0' is ⅔, and the loading factor of 'segment 1' and 'segment 2' is ⅙; the subchannels corresponding to ⅔ of the total subchannels are allocated for the 'segment 0', and the remaining subchannels are uniformly distributed and allocated for the 'segment 1' and 'segment 2', as shown in FIG. 5.

The map message generating means 230 prepares the UL zone switch IE and UL allocation start IE by setting the identical permbase value and the different subchannel offsets for the respective segments. Thus, the data burst is allocated to the different subchannels for each segment, to thereby decrease the interference among the segments.

If the loading factor of each segment, which is determined by the loading-status determining means 220, is greater than the first threshold value and smaller than the second threshold value, for example, if the segment loading factor is between ⅓ and ½, the map message generating means 230 sets the identical permbase value included in the UL zone switch IE for the two segments, and sets the different permbase value for the remaining one segment. For example, the permbase value for each of the 'segment 0' and 'segment 1' is identically set as 'x', and the permbase value for the 'segment 2' is set as 'x+1'. Also, the value of 'Use All SC Indicator' indicating the subchannel use type is set as '1' so that all the subchannels are used.

In case of the subchannel offset included in the UL allocation start IE, the different subchannel offsets are set for the two segments with the identical permbase value. In this case, the subchannel offset for the segments with the identical permbase value may be calculated by the following Equation 3.

$$\text{subchannel offset} = \text{round}\left(\frac{\text{the number of subchannels}}{\text{the number of segments with the same permbase value}}\right) \times \text{segment number} \quad [\text{Equation 3}]$$

For example, the number of subchannels in the UL PUSC zone is 35, and the permbase value is identically set for the 'segment 0' and 'segment 1'; the subchannel offset of 'segment 0' is determined as '0', and the subchannel offset of 'segment 1' is determined as '18' by the above Equation 3.

The subchannel offset for the remaining one segment with the different permbase value applied thereto may be set as '0'. In a modified embodiment of the present invention, if satisfying that all the subchannels in the segment with the different permbase value applied thereto are defined as the data burst allocation region, the subchannel offset may be set as any other value as well as '0'.

According to one embodiment of the present invention, the interference mitigation hardly occurs in the segment with the different permbase value applied thereto. In this respect, the segment with the different permbase value applied thereto may be rotated, or the segment to be provided with the different permbase value may be determined as the segment where a mobile station with high CINR (Carrier to Interference Noise Ratio) exists.

Meanwhile, in case that some of the subchannels may be used in each segment for the uplink duration for the data burst allocation region in the UCD message, and the entire cell loading factor determined by the loading-status determining means 220 is larger than a predetermined threshold value, it is efficient to allocate the data burst to all the subchannels and to average out the interference among the segments through the permutation. Accordingly, the map message generating means 230 prepares the UL zone switch IE to allocate the data burst to all the subchannels for the uplink duration in each segment of the map region.

In more detail, if the cell loading factor determined by the loading-status determining means 220 is larger than the predetermined threshold value, the map message generating means 230 sets the different permbase values to the segments included in the UL zone switch IE, and also sets the value of 'Use All SC Indicator' as '1' to thereby use all the subchannels for each segment.

The map message generating means 230 sets the different permbase values for each segment, and sets the subchannel use type to use all the subchannels, to thereby allocate the data burst to all the subchannels for each segment, and simultaneously to decrease the interference among the segments by averaging the interference through the permutation using the different permbase values.

The UCD message generated by the aforementioned UCD message generating means 210 and the map message generated by the map message generating means 230 are transmitted to the mobile station managed by a corresponding base station. Then, the mobile station receiving the UCD message and map message from the corresponding base station allocates the UL data burst to the data burst allocation region defined by the UCD message and map message.

In more detail, if the UCD message received in the mobile station from the base station indicates that the data burst is allocated to all the subchannels for the uplink duration, the data burst is allocated to all the subchannels. Also, if the map message received in the mobile station from the base station includes the UL zone switch IE and UL allocation start IE, the data burst is allocated to the subchannels defined by the UL zone switch IE and UL allocation start IE.

If the UCD message received in the mobile station from the base station indicates that the data burst is allocated to some of the subchannels for the uplink duration, the data burst is allocated to some of the subchannels. Also, if the map message received in the mobile station from the base station includes the UL zone switch IE, the data burst is allocated to all the subchannels defined by the UL zone switch IE.

As mentioned above, the subchannels may be dynamically changed by allocating at least one of the UL zone switch IE and UL allocation start IE to the map region according to the cell loading status, to thereby mitigate the uplink interference with high efficiency.

For the aforementioned explanation, the uplink interference mitigation apparatus according to the embodiment of the present invention includes the plural means which are separately provided to carry out their own functions. However, a modified embodiment of the present invention may disclose a multi-functional integrated means.

A method for mitigating the uplink interference will be described with reference to FIGS. 6 and 7.

Figure 6:
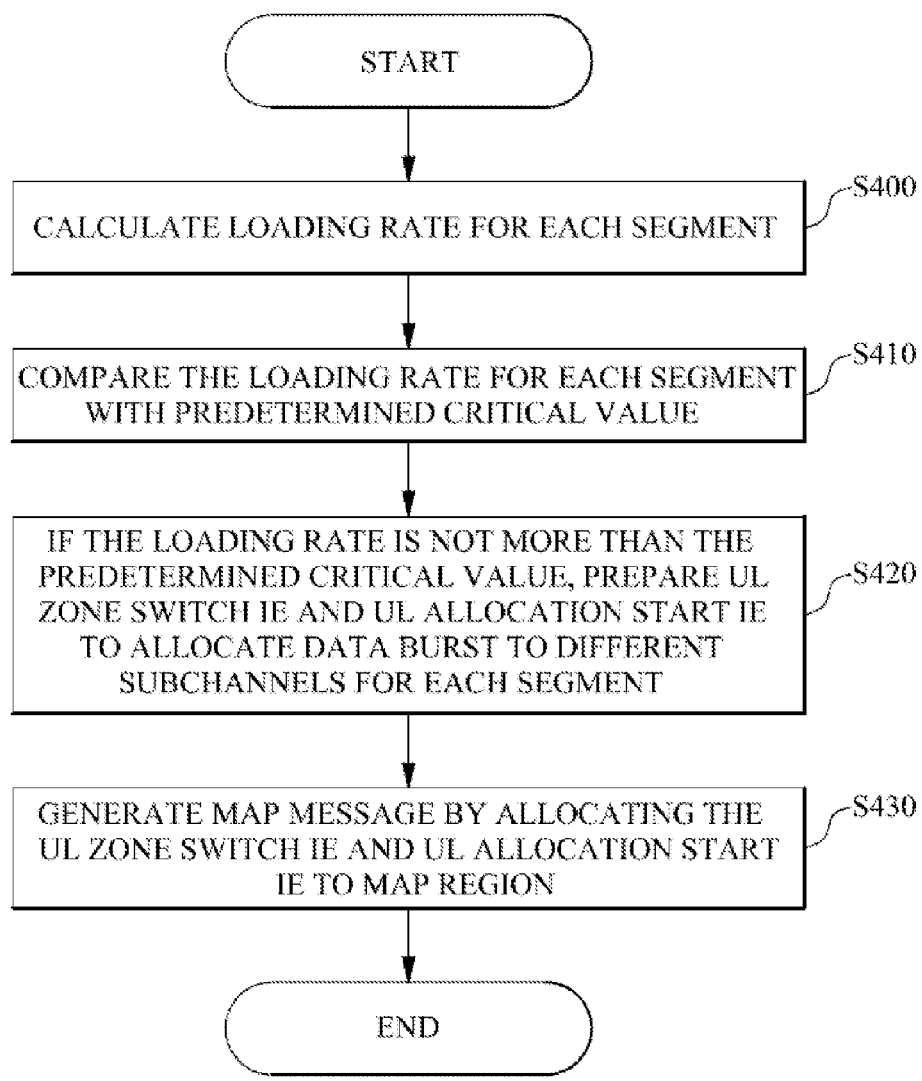
FIG. 6 is a flow chart illustrating an uplink interference mitigation method according to one embodiment of the present invention.

FIG. 6 is a flow chart for explaining the uplink interference mitigation method in case of the UCD message defining that the data burst is allocated to all the subchannels for the uplink duration.

As shown in FIG. 6, the loading factor of each segment is calculated by the data burst information received from the upper layer (S400). In this case, as mentioned above, the loading factor of each segment may be calculated by the ratio of the total number of usable slots and the number of slots required by the scheduling result. In one embodiment of the present invention, the loading factor may be determined every frame or every scheduling period.

If the loading factor of each segment is high, the interference becomes worse among the segments. In this respect, the loading factor of each segment is calculated so as to dynamically change the subchannels allocated with the data burst according to the loading status of each segment.

Then, the loading factor of each segment is compared with the predetermined threshold value (S410). Based on the comparison result, if the loading factor of each segment is not greater than the predetermined threshold value, the UL zone switch IE and UL allocation start IE are prepared to allocate the data burst to the different subchannels for each segment (S420).

In one embodiment of the present invention, if the loading rate of each segment is not greater than ⅓; the permbase value of the segment included in the UL zone switch IE is identically set for each segment, the value of 'Use All SC Indicator' is set as '1', and the subchannel offsets for the segments included in the UL allocation start IE are set differently. In this case, the subchannel offset for each segment may be calculated by the above Equation 2.

In another embodiment of the present invention, if the segment loading factor is between ⅓ and ½, the permbase value included in the UL zone switch IE is identically set for the two segments, and is differently set for the remaining one segment, wherein the value of 'Use All SC Indicator' for all the segments is set as '1'. Also, the subchannel offset in the two segments with the same permbase value may be set through the above Equation 3, and the subchannel offset in the remaining one segment with the different permbase value may be set as '0'. At this time, if satisfying that all the subchannels in the segments with the different permbase value are defined as the data burst allocation region, the subchannel offset may be set as any other value as well as '0'.

Then, the map message is generated to allocate the UL zone switch IE and UL allocation start IE to the map region of each segment frame (S430).

The UCD message and map message generated by the aforementioned process are transmitted to the mobile station. Thus, the mobile station receiving the UCD message and map message sequentially allocates the data burst to all the subchannels defined by the UCD message. If the map message includes the UL zone switch IE and UL allocation start IE, the data burst is sequentially allocated to the subchannels defined by the UL zone switch IE and UL allocation start IE.

Figure 7:
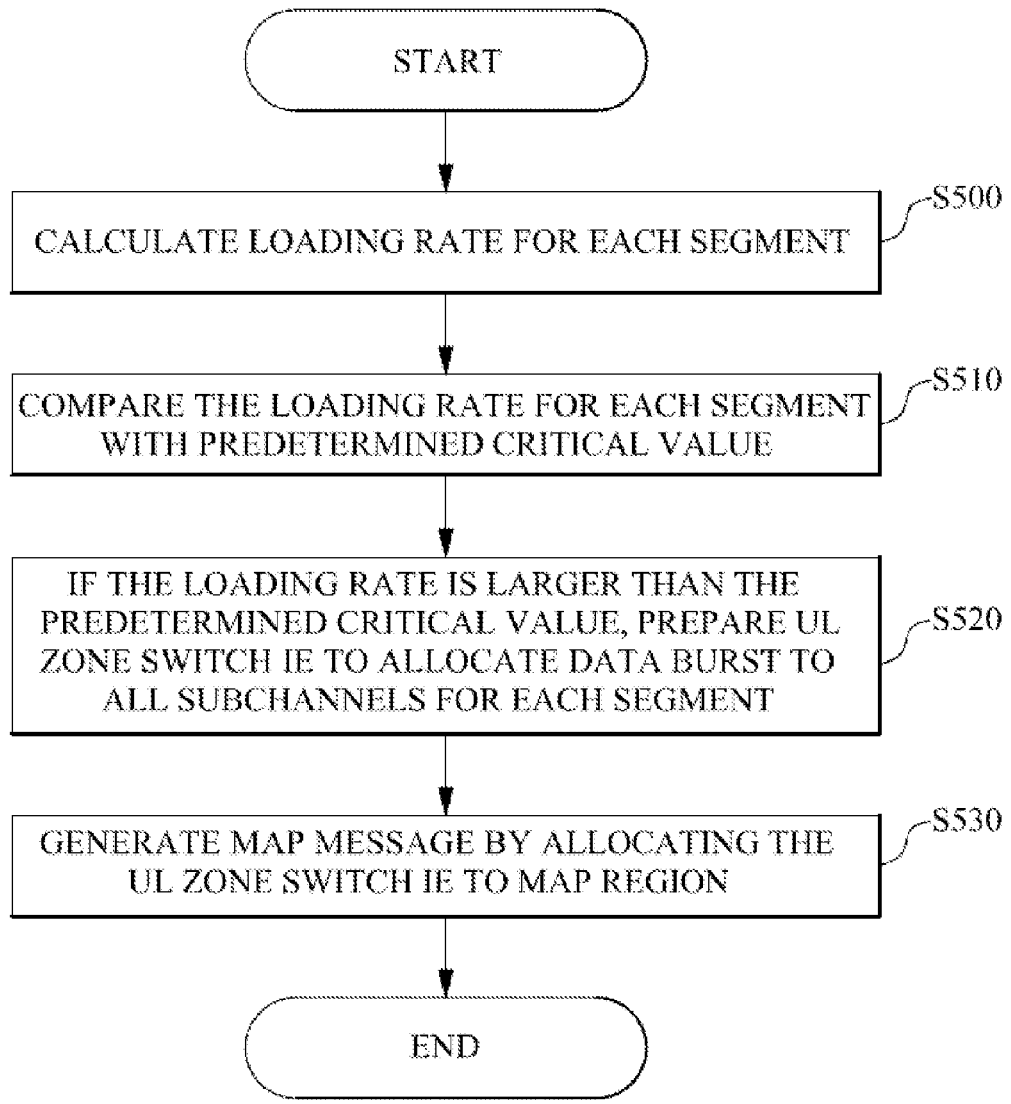
FIG. 7 is a flow chart illustrating an uplink interference mitigation method according to another embodiment of the present invention.

FIG. 7 is a flow chart for explaining the uplink interference mitigation method according to another embodiment of the present invention, wherein the UCD message defines that the data burst is allocated to some of the subchannels for the uplink duration.

As shown in FIG. 7, the cell loading factor and the loading factor of each segment are calculated by the data burst information received from the upper layer (S500). In this case, as mentioned above, the cell loading factor and the loading factor of each segment may be calculated by the ratio of the total number of usable slots and the number of slots required by the scheduling result. In one embodiment of the present invention, the loading factor may be determined every frame or every scheduling period.

As explained in S400 of FIG. 6, the loading rate of each segment is calculated because the segment interference is affected by the loading status of each segment. In this respect, the loading factor of each segment is calculated so as to dynamically change the subchannels allocated with the data burst according to the loading status of each segment.

Then, the loading factor of each segment is compared with the predetermined threshold value (S510). Based on the comparison result, if the loading factor of each segment is larger than the predetermined threshold value, the UL zone switch IE may be prepared to use all the subchannels on the data burst allocation for each segment (S520).

In more detail, if the loading factor of each segment is larger than the predetermined threshold value, the permbase value included in the UL zone switch IE is differently set for all the segments, and the value of 'Use All SC Indicator' indicating the subchannel use type is set as '1'. All the subchannels are used for each segment through the aforementioned setting. However, the permbase values for the segments are set differently so that the interference is mitigated by averaging.

The UL zone switch IE is allocated to the map region of each segment frame, to thereby prepare the map message (S530).

According to the aforementioned process, the generated UCD message and map message are transmitted to the mobile station. Then, the mobile station receiving the UCD message and map message sequentially allocates the data burst to some of the subchannels defined by the UCD message. If the UL zone switch IE is included in the map message, the data burst is sequentially allocated to all the subchannels defined by the UL zone switch IE.

The aforementioned uplink interference mitigation method may be embodied in type of program performed through the use of various computer means. At this time, the uplink interference mitigation method is recorded in a computer-readable recording medium, for example, hard disc, CD-ROM, DVD, ROM, RAM, or flash memory.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An uplink interference mitigation method performed by a base station (BS) in a communication system comprising:
   allocating, for a mobile station, a first set of frequency resource units related to a sector, wherein the first set of frequency resource units correspond to at least one bit position of a physical band bitmap;
   acquiring load information including load information of a neighboring sector, the load information being associated with interference occurring in uplink, wherein the load information associated with the interference is based on an interference level;
   determining whether the interference level is higher or lower than a threshold value;
   setting a second set of frequency resource units for the mobile station differently from the first set of frequency resource units if there is a third set of frequency resource units having the interference level higher than the threshold value; and
   performing uplink scheduling for the mobile station within the second set of frequency resource units, wherein the uplink scheduling includes allocating, for the mobile station, the second set of frequency resource units related to the sector with avoiding the third set of frequency resource units related to the neighboring sector based on the load information.

2. The method of claim 1, further comprising:
   transmitting information on allocation of the first set of frequency resource units to the mobile station; and
   transmitting information on allocation of the second set of frequency resource units to the mobile station.

3. The method of claim 1, wherein the load information is updated in a predetermined time.

4. The method of claim 3, wherein the predetermined time is a frame or scheduling period.

5. An apparatus for a base station (BS) performing uplink interference mitigation in a communication system comprising:
   a processor;
   a receiver; and
   a transmitter,
   wherein the processor is configured to:
   allocate, for a mobile station, a first set of frequency resource units related to a sector wherein the first set of frequency resource units correspond to at least one bit position of a physical band bitmap;
   acquire, using the receiver, load information including load information of a neighboring sector, the load information being associated with interference occurring in uplink, wherein the load information associated with the interference is based on an interference level;
   determine whether the interference level is higher or lower than a threshold value;

set a second set of frequency resource units for the mobile station differently from the first set of frequency resource units if there is a third set of frequency resource units having the interference level higher than the threshold value; and performing uplink scheduling for the mobile station within the second set of frequency resource units, wherein the uplink scheduling includes allocating, for the mobile station, the second set of frequency resource units related to the sector with avoiding the third set of frequency resource units related to the neighboring sector based on the load information.

6. The apparatus of claim 5, the processor is further configured to:

transmit, using the transmitter, information on allocation of the first set of frequency resource units to the mobile station; and transmit, using the transmitter, information on allocation of the second set of frequency resource units to the mobile station.

7. The apparatus of claim 5, wherein the load information is updated in a predetermined time.

8. The apparatus of claim 7, wherein the predetermined time is a frame or scheduling period.

\* \* \* \* \*